J. E. Emerson,
Gage for Saw Filer.
No. 111,829. Patented Feb. 14, 1871.
Fig. 1.
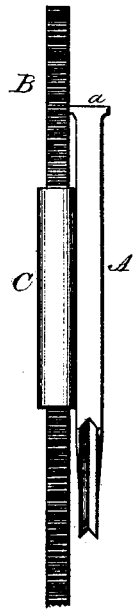
Fig. 2.
Fig. 5.
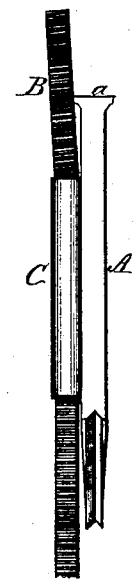
Fig. 4. Fig. 3.
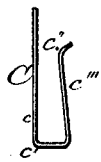 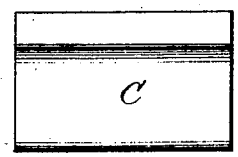
Witnesses:
James G. Smith
Chas. C. Wilson
Inventor:
James E. Emerson
By N. Crawford
Atty.

United States Patent Office.

JAMES E. EMERSON, OF TRENTON, NEW JERSEY.

Letters Patent No. 111,829, dated February 14, 1871.

IMPROVEMENT IN GAUGES FOR SAW-FILERS.

The Schedule referred to in these Letters Patent and making part of the same.

I, JAMES E. EMERSON, of Trenton, in the county of Mercer in the State of New Jersey, have made certain Improvements in Gauges for Dressing the Sides of Saw-Teeth, of which the following is a specification.

The teeth of saws, when swaged, in order to keep the extreme cutting edge enough wider than the body of the tooth or plate to cut its kerf wide enough to clear the saw from friction on the sides, are, when first from the swage, irregular in their widths on the cutting-edge; and, before they can be used in sawing, have to be dressed to an exact width, and the edge of each tooth must project an equal distance from the sides of the teeth or plate of the saw. To do this successfully a gauge for dressing the sides of the cutting-edge of the teeth has to be employed, and this invention relates to such gauge; and It consists in the use of a sheet-metal gauge, constructed to be clamped upon a common flat file, or a file that is bent, and gauge the distance at which the cutting-edge shall project from the sides of the saw-tooth or blade.

In the drawing—

Figure 1 is a view of a section of a saw-tooth, with the file and gauge in position;

Figure 2 is a transverse view of the same;

Figure 3 is a longitudinal side view of the gauge;

Figure 4 is a transverse view of fig. 3; and

Figure 5 is a modification of fig. 1.

A represents the tooth, or a portion of a saw-plate with a tooth that is swaged at its cutting-edge $a$ to be wider than the body of the tooth or plate of the saw.

B is a common file or a sharp grit-stone, and is the instrument by which the sides of the teeth are cut to a width, as seen in fig. 1, or it may be bent in the shape seen in fig. 5.

By bending the file and applying it to the tooth, as thus shown, the cutting-face of the file will always leave the extreme point or cutting-edge of the tooth the broadest, and will be sure to have each opposite extreme point of the cutting-ege project an equal distance from the body of the tooth or plate of the saw, as the gauge will stop the file from cutting when it rubs against the side of the tooth or plate of the saw; each tooth will then have the same width of cutting-edge projecting equally alike on both sides of the tooth and plate, and the teeth will all revolve in the same width of kerf without friction, or one tooth cutting outside of the path of the other.

C is the gauge that stops the file from cutting the sides of the cutting-edges of the teeth when it strikes or rubs against the sides of the body of the tooth or saw-plate.

Gauge C is formed from sheet metal by merely bending it in the form shown in fig. 3, which will clamp itself around the body of a common flat file, either straight or bent, and thus hold it in position on the file, as seen in fig. 2, or it may be made of wood, and held in position, or even strong paper will answer a good purpose, as no wear but on the smooth side of a saw-plate is put upon it, but I prefer the sheet-metal gauge, as shown in figs. 3 and 4.

In fig. 3, the long arm $c$ of the bent metal is straight, and bent at $c'$ to a right angle with the side $c$, and continues a greater distance than the thickness of the file; then it is bent to an acute angle, and so that at the point $c''$ of the side $c'''$ it will be much nearer to the side $c$ than where it forms a right angle, and have less width than the thickness of the file it holds. At point $c''$ it suddenly turns outwardly, in order easily to receive the file.

This shape of gauge-plate gives a spring to the bent piece, and it will firmly adhere to the file when the file is placed within it, as seen in fig. 2.

Whenever the thickness of the sheet metal that forms the gauge C is not so thick as is desired to have the edge project from the body of the tooth or blade of the saw, a packing of paper or other thin material that is uniform in thickness can be inserted between the file and the sheet-metal gauge, as seen at B in fig. 2.

When insertible teeth of saws are cut from a blank having a flange or projection at its outer edge, the gauge may bear against the projecting flange, and in such case a single thickness of the metal in the gauge will be sufficient. But when the teeth are cut from a smooth plate of equal thickness it may require the cutting-file to be stopped at a greater distance from the plate of the saw, thereby giving a greater projection of width from the body of the saw than is necessary when the flanged tooth is used to project from the flange.

This gauge, for truly dressing the sides of the cutting-edges of saw-teeth, is simple, within the reach of every one having a common flat file and a piece of sheet metal of proper thickness, is desirable, and does not prevent the file, if a straight one, from being used for other purposes at any time when wanted, for the sheet-metal gauge can be quickly removed from the file, and as quickly replaced again when wanted, and the simplicity and adaptability of the device make it valuable.

I do not wish to confine myself to the use of a file for dressing the sides of the cutting edges of saw-teeth, as other substances, such as sharp grit-stones, and composition of different kinds and under different names, that will answer the same pur— pose, can be used with the gauge and have the same result.

Having thus described my invention, What I claim, and desire to secure by Letters Patent, is—

The bent-metal spring-gauge plate C, in combination with the file, straight or bent, or other equivalent device, when constructed, applied, and used in the manner and for the purpose shown and described.

J. E. EMERSON.

Witnesses:
 ANDREW HUMBERT,
 S. H. RANKIN.